Nov. 15, 1966     L. R. BELL     3,285,013
ABLATIVELY COOLED ROCKET WITH NON-ERODING THROAT
Filed July 16, 1962
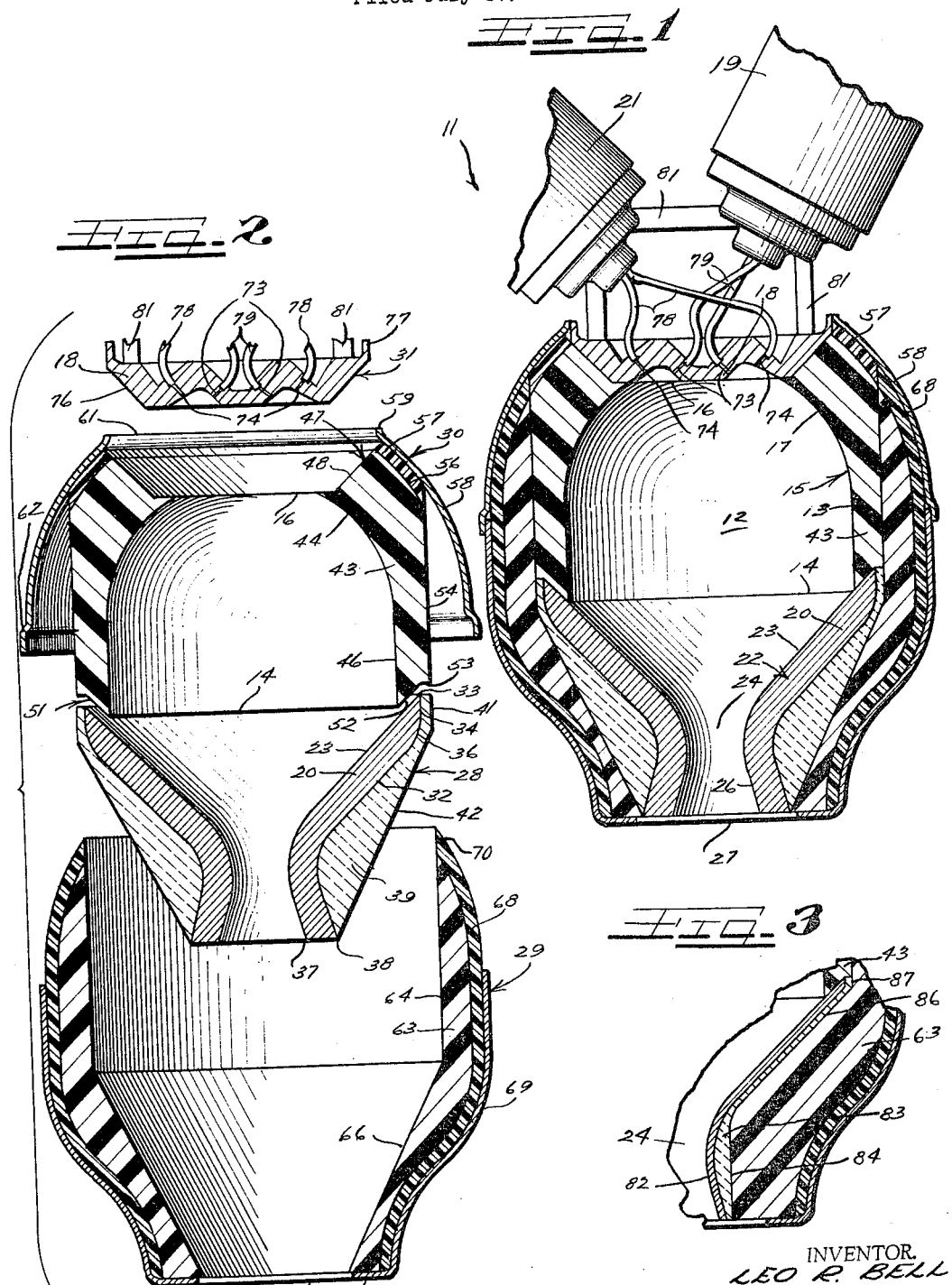
INVENTOR.
LEO R. BELL

3,285,013
ABLATIVELY COOLED ROCKET WITH NON-ERODING THROAT
Leo R. Bell, Sherman Oaks, Calif., assignor to TRW Inc., a corporation of Ohio
Filed July 16, 1962, Ser. No. 210,146
3 Claims. (Cl. 60—258)

This invention generally relates to rocket motors and more particularly relates to ablatively cooled rocket motors.

Ablatively cooled rocket motors have the main disadvantage of having a nozzle portion that erodes and varies in size during the operation of the rocket. Ablative rockets generally contain ablative material over the entire inner surface of the rocket motor or separate coatings for producing a non-eroding nozzle. The ablative material burns and varies the nozzle dimensions when coated along the entire inner surface. Also, separate non-eroding nozzle coatings did not have the structural integrity to withstand the high temperature and pressures exerted thereon by the exiting combusion gases. Constant nozzle dimensions are important in maintaining effective and calculatable operation of the rocket motor. Further, ablatively cooled rockets lacked the versality of assembly-line manufacture and each rocket had to be independently manufactured, coated, and machined.

The present invention advantageously utilizes assembly-line type manufacture and produces an ablatively cool rocket motor with a non-eroding throat.

It is therefore an object of the present invention to provide a method of manufacturing ablatively cooled rocket motors having a non-eroding throat.

It is still another object of the present invention to provide an ablatively cooled rocket motor and the method of manufacturing an ablatively cooled rocket motor with a non-eroding nozzle insert therein.

Other features and objects of the present invention will be apparent to those skilled in the art from the following detailed description and the annexed sheet of drawing in which like reference characters refer to like parts in the several figures.

On the drawings:

FIGURE 1 is a partial longitudinal cross-sectional view of the assembled ablatively cooled rocket motor of the present invention having non-eroding nozzle;

FIGURE 2 is a longitudinal cross-sectional view showing the step process of assembling the ablatively cooled rocket motor illustrated in FIGURE 1; and FIGURE 3 is a partial longitudinal cross-sectional view of the nozzle area of another rocket motor of the present invention.

As shown on the drawings:

Referring to FIGURE 1, there is illustrated the assembled rocket motor 11 of the present invention. The rocket motor 11 has a combustion chamber 12 defined by an inverted cup shaped combustion chamber housing 15 having an inner cylindrical side wall 13 defining a circular combustion chamber open exit end 14. The end opposite the exit end 14 is a circular open feed end 16 defined by a concave end wall 17. Attached to the open feed end of the combustion chamber housing 15 is a feed orifice plate 18 having connected thereto an oxidizer solenoid valve operated injector 19 and a hypergolic fuel solenoid valve operated injector 21. Feed orifice plate 18 is, of course, a heat barrier between the fuel and the combustion chamber, of the type well known in the art.

Opposite the open feed end 16 and connected to the combustion chamber exit end is a Da Laval type nozzle 22 defined by a conical or tapered inner wall 23 converging from the cylindrical wall 13 to define a throat 24 and then diverging from the throat to define an exhaust nozzle portion 26 with an exit opening 27 larger than the throat 24.

Referring to FIGURES 1 and 2, there is illustrated the various sections which are used to manufacture the ablatively cooled rocket motor of the present invention. The rocket motor 11 is composed of a nozzle insert 28, a body portion 29, a combustion chamber portion 30 and a head portion 31.

The nozzle insert 28 is composed of a non-eroding metal alloy tube 20 having its inner wall 23 parallel to its outer wall 32. However, at an entrance end 33 of the nozzle insert, the outside wall 32 meets with the inside wall 23 and extends longitudinally downwards therefrom for a short distance, as indicated by 34, and is rounded at 36 to continue extending parallel to the inner wall 23. The alloy tube 20 is preferably composed of an alloy of molybdenum with 0.5% titanium and 0.06% zirconium and the alloy is coated with molybdenum disilicide. As was described above, the tubular molybdenum alloy tube 20 has frusto-conical inner walls 23 and outer walls 32 converging to form the throat 24 and diverging from the throat 24 to define exhaust nozzle portion 26.

The uniform wall thickness of the molybdenum alloy nozzle tube 20 minimizes thermal stock and allows the tube to go through its embrittlement range uniformly. While a molybdenum alloy coated with molybdenum disilicide is preferably used to present a non-eroding surface to the hot oxidizing exhaust gases of the rocket motor 11, it is understood that any suitable non-eroding material that is capable of withstanding the high temperatures and pressures encountered in a rocket nozzle would be suitable for the rocket nozzle tube 20. Further, the term "non-eroding" is, of course, a term of the art and has developed a secondary meaning not to be confused with the literary meaning, thus the rocket nozzle insert is non-eroding in relation to the combustion chamber, described in greater detail hereinafter.

After the rocket nozzle tube 20 is formed to the shape desired, all the corners 33, 37, and 38 are rounded. Then bonded on the entire outer wall 32 is a zirconia plasma jet spray coating 39. The rounded corners allow the zirconia coating to be firmly bonded to the entire outer surface of the non-eroding alloy tube whereas sharp corners would cause the zirconia to break-away at the alloy tube corners.

The zirconia coating 39 forms a cylindrical wall 41 around the entrance end of the molybdenum alloy tube 20 parallel with the longitudinal portion 34 of the outside alloy tube wall 32 and approximately the same length. Converging from the cylindrical wall 41 is a conical wall 42 which tapers to and meets the tube corner 38. The outside walls of the zirconia coating 39 are ground to the size desired and the nozzle insert 28 is completed. The zirconia coating 39 insulates the throat tube 20 and holds the metal at a uniform temperature and minimizes conduction of heat therethrough.

It is of course understood that any material having the same characteristics as zirconia in the above described instance, may be used to coat the metal alloy insert tube 20.

The combustion chamber section 30 is composed of an ablative molded plastic tubular housing 43 having an inverted cup-shaped cavity or combustion chamber 21. The cavity or combustion chamber has cancave end walls 44 defining the circular open feed end 16 and cylindrical side wall 46 defining the exit end 14.

A circular pie-pan shaped cavity feed end wall 47 having conical side wall 48 and base 49 with the circular opening 16 therethrough is defined by the tubular housing 43. Opposite the feed end wall 47 there is defined an exit end wall 51 with a tapering or conical wall 52 diverging from the exit opening 14 to a shoulder 53. The wall 52 tapers at the same angle as the insert wall 23 converges. The shoulder 53 extends to the outer cylindrical wall 54. The cylindrical wall 54 extends to an upper frusto-ogive wall 56. Molded to the frusto-ogive wall 56 is a phenolic resin impregnated asbestos tape 57 which forms continuous walls with the tapering wall 48 and the cylindrical wall 54. Bonded to the outside surface of the phenolic resin impregnated tape 57 is a bowl shaped outer metal casing 58. The casing being made preferably from stainless steel or a wound filament to give pressure vessel strength to the rocket motor.

The outer casing 58 has a cylindrical rim 59 defining an opening 61 and a cylindrical counterbored fastening rim 62 at its other end. The sides of the casing follow the curvature of the frusto-ogive wall 56 separating the casing from the cylindrical wall 54. As is noted in FIGURES 1 and 2, the cylindrical wall 54 has an outer diameter substantially equal to the outer diameter of the coating cylindrical wall 41 and the thickness of the zirconia coating at the entrance end 33 is approximately equal to the width of the shoulder 53.

The molded plastic tubular housing is preferably made by molding phenolic resin impregnated silica fiber fluff with one-half inch silica fibers forming the major amount of the fiber mixture and the resulting density of the plastic being approximately 120 lbs. per cubic foot. The molded plastic is machined to give the close fitting and finished surfaces described above. The asbestos tape is also impregnated with phenolic resin and has an outside layer of a non-ablative silicate covering such as "Min-K." After the tape is wrapped on the machined molded plastic housing 43 the tape is molded to the housing and then machined to give finished interfitting surfaces.

It is of course understood that any equivalent ablative molded plastic material may be substituted for the phenolic resin impregnated silica fluff, described above, in practicing the present invention. This also being true of the asbestos tape used to wrap the housing.

The body portion 29 is composed of a molded plastic housing 63 having an inner cylindrical wall 64 with lower inner tapered wall 66 converging to an open end 67. The body tapering wall 66 converges at an angle the same as the insert tapered wall 42 and for the same distance thereof. Also, the inner diameter of the cylindrical wall 64 is equal to the outer diameter of the cylindrical insert wall 41 and combustion chamber cylindrical wall 54. The length of the cylindrical wall 64 being equal to the length of the chamber housing cylindrical wall 54 plus the length of the insert cylindrical coating wall 41. The plastic body of the housing is composed preferably of the same material as the combustion chamber housing 43. However, any suitable ablative or insulative material may be utilized for constructing the housing 63.

After the housing is machined, the entire outer circumference is then wrapped with phenolic impregnated asbestos tape 68 having an outside surface coated with a non-ablative coating such as a silica coating called "Min-K." The tape is then submitted to molding pressures and temperatures and molded onto the plastic housing. Bonded to the tape surface is an exterior casing 69 of stainless steel or wound filament. The casing encompasses the majority of the tape surface and has an end 71 that wraps around the exit end wall of the molded plastic housing 63 and tape 68, and another end 70 that interfits the counterbore combustion chamber casing fastening rim 62.

The molded plastic housing and tape are machined and finished to present interfitting surfaces to the nozzle insert 28 and the combustion chamber section 30.

The head section 31 is composed of an orifice plate 18 having a plurality of oxidizer orifices 73 and fuel orifices 74 bored therethrough. The orifice plate 18 has a frusto-conical configuration with conical side wall 76 machined to interfit with the combustion chamber conical end wall 48. The frusto-apex of the plate 18 being equal to the outer diameter of the chamber shoulder 49 so that the plate sits thereon. The base of the plate has a cylindrical extending rim 77 that is to be attached to the inner surface of the metal casing rim 59.

The oxidizer orifices are centrally bored through the plate and an equal number of fuel orifices are bore surrounding the oxidizer orifices. The oxidizer and fuel orifices are bored at an angle so that the oxidizer orifices are paired with the fuel orifices to provide fuel and oxidizer impingement in the combustion chamber at the correct rate. The fuel orifices are connected to the solenoid valve operated fuel injector 21 by fuel supply conduits 78 and the oxidizer orifices are connected to the solenoid valve operated oxidizer injector 19 by oxidizer supply conduits 79. The fuel conduits all have the same size and length and the oxidizer conduits all have the same size and length to insure accurate flow of oxidizer and fuel through the respective conduits. The oxidizer and fuel conduits are relatively sized to effect complete combustion of the fuel and oxidizer. The solenoid injectors are fastened to the plate 72 by mounting bars 81 which hold the injectors away from the rocket body and provide a heat barrier therebetween.

After separately manufacturing the head section 31, the combustion chamber section 30, the nozzle insert section 28, and the body section 29, the sections are interfitted and bonded together. The material used to bond the sections, so as to form the rocket motor illustrated in FIGURE 1, is an epoxy resin or equivalent resinous bonding material. This epoxy resin bond is also used to bond the metal casings 58 and 69 to the asbestos tapes 57 and 68 respectively.

Therefore, as illustrated by FIGURE 1, the present invention provides a rocket motor with an ablative combustion chamber housing 43, that burns away and maintains the rocket surface cool, and with a non-eroding nozzle tube 20, that maintains structural integrity and constant nozzle dimensions. A small exhaust nozzle area is used for rocket motors that are used at sea level and a large exhaust nozzle area for longer duration space rocket motors.

The embodiment of the present invention illustrated by FIGURE 3 is manufactured in the same manner as that of FIGURES 1 and 2. The various sections of the rocket are substantially identical and have interfitting cylindrical and conical faces. The major distinctions are in the nozzle insert section. This embodiment has a thinner nozzle insert molybdenum metal alloy tube 82 having the same configuration as the insert tube 20. However, after rounding the corners of the insert tube 82 there is secured thereto a zirconia plasma jet spray coating 83 having a cylindrical outer surface 84 surrounding the nozzle throat 24 and nozzle exhaust portion 26. From the cylindrical surface 84 there diverges a uniform conical or tapered surface 86 with a top cylindrical rim 87. The zirconia coating performs the same function—it prevents heat from transferring from the exhaust gases to the molded plastic 63, and maintains the metal alloy at a uniform temperature.

Therefore the present invention provides a method of making an ablatively cooled rocket motor and ablatively cooled rocket motor having an ablative combustion chamber, that will burn away, and a non-eroding nozzle that will not burn away, maintains constant nozzle dimensions, minimizes thermal shock, and goes through its embrittlement range uniformly.

From the above description, the preferred method of making the body section 29 and the combustion chamber section 30 is to first mold the phenolic impregnated silica fiber fluff tubular walls; then place the molded tubular walls on a mandrel and machine the outer diameter of the tubular walls; then wrap the outer diameter with phenolic impregnated asbestos tape and remold to bond the tape to the tubular walls; then remachine the outer diameter of the remolded wrapped tubular walls; and then remove the mandrel and machine the inner diameter of the tubular walls.

The combustion chamber section of course, as was pointed out above, is only partially wrapped on its outer diameter with phenolic impregnated asbestos tape.

It is obvious that certain changes may be made in the above method and rocket motor as described without departing from the scope of the present invention and thus the invention is not limited to the precise details as set forth but includes any changes in alternations as generally fall within the spirit and scope of the appended claims.

I claim as my invention:

1. An ablatively cooled rocket motor comprising an open ended ablative body converging toward one end and defining a combustion chamber, a head spanning and closing the convergent end of the body, means carried by said head for injecting fuel and oxidizer through the head for burning in the combustion chamber, a tubular nozzle at the opposite open end of the body converging to a reduced diameter throat beyond the body and then diverging from the throat to define an outwardly flaring exit portion, said tubular nozzle having a uniform thickness throughout its length to minimize thermal shock and being composed of a high temperature substantially erosion resistant metal alloy, an insulating cover surrounding said tubular nozzle minimizing heat conduction therethrough, and a multi-piece housing including a first portion enveloping said cover and a second portion enveloping a part of the first portion and surrounding said body and head.

2. The rocket motor of claim 1 wherein the tubular nozzle is composed of a molybdenum alloy containing titanium and zirconium and is coated with molybdenum disilicide.

3. The rocket motor of claim 1 wherein the insulating cover around the tubular nozzle is composed of zirconia.

References Cited by the Examiner

UNITED STATES PATENTS

| | | | |
|---|---|---|---|
| 2,699,036 | 1/1955 | Nicholson | 60—35.6 |
| 2,744,043 | 5/1956 | Ramberg | 156—155 |
| 2,749,254 | 6/1956 | Slyh et al. | 60—35.6 |
| 2,835,107 | 5/1958 | Ward | 60—35.6 |
| 2,849,860 | 9/1958 | Lowe | 60—35.6 |
| 2,975,588 | 3/1961 | Smith | 60—35.6 |
| 2,977,754 | 4/1961 | Bell | 60—35.6 |
| 2,987,874 | 6/1961 | Nicholson | 60—35.6 |
| 2,987,880 | 6/1961 | Kimmel | 60—35.6 |
| 2,995,011 | 8/1961 | Kimmel | 60—35.6 |
| 3,021,241 | 2/1962 | Schneiderman et al. | 156—173 |
| 3,023,572 | 3/1962 | Teague | 60—35.6 |
| 3,060,687 | 10/1962 | Mosher et al. | 60—39.47 |
| 3,074,585 | 1/1963 | Koontz | 60—35.6 X |
| 3,099,959 | 8/1963 | Bowersett | 60—35.6 X |
| 3,102,037 | 8/1963 | Kimpel | 60—35.6 X |
| 3,104,523 | 9/1963 | O'Donnell | 60—35.6 |
| 3,115,746 | 12/1963 | Hsia. | |
| 3,129,560 | 4/1964 | Prosen | 60—35.6 |
| 3,135,297 | 6/1964 | Nordberg et al. | |
| 3,156,091 | 11/1964 | Kraus | 60—35.6 |

FOREIGN PATENTS 757,890   9/1956   Great Britain.

OTHER REFERENCES

"Rocket Refractories," NAVORD Report 4893, NOTS 1191, August 25, 1955, pages 9–15 and 20–38 relied on.

"Astrolite," H. I. Thompson Fiber Glass Company, Products Bulletin PB 7-24A, November 21, 1957 (pages 1–5 relied on).

MARK NEWMAN, *Primary Examiner.*

SAMUEL LEVINE, *Examiner.*

C. R. CROYLE, *Assistant Examiner.*